US012600313B2

(12) United States Patent
Ehlers et al.

(10) Patent No.: US 12,600,313 B2
(45) Date of Patent: Apr. 14, 2026

(54) VEHICLE SEAT

(71) Applicant: Autoliv Development AB, Vargarda (DE)

(72) Inventors: Jens Ehlers, Horst (DE); Andre Gajek, Norderstedt (DE); Johann Unger, Rohrbach (DE); Christoph Grundheber, Gaimersheim (DE); Tim Schiesser, Irschenberg (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/848,445

(22) PCT Filed: Feb. 16, 2023

(86) PCT No.: PCT/EP2023/053923
§ 371 (c)(1),
(2) Date: Sep. 18, 2024

(87) PCT Pub. No.: WO2023/179980
PCT Pub. Date: Sep. 28, 2023

(65) Prior Publication Data
US 2025/0214527 A1 Jul. 3, 2025

(30) Foreign Application Priority Data
Mar. 23, 2022 (DE) ..................... 10 2022 106 752.1

(51) Int. Cl.
B60R 21/207 (2006.01)
B60N 2/68 (2006.01)
(Continued)

(52) U.S. Cl.
CPC .............. B60R 21/207 (2013.01); B60N 2/68 (2013.01); B60R 21/2338 (2013.01);
(Continued)

(58) Field of Classification Search
CPC .............. B60R 21/207; B60R 21/2338; B60R 2021/161; B60R 2021/23386; B60R 22/1952; B60R 2021/23388
See application file for complete search history.

(56) References Cited

U.S. PATENT DOCUMENTS 6,029,993 A * 2/2000 Mueller .............. B60R 21/2338
280/730.2
11,208,070 B1 12/2021 Jaradi et al.
(Continued)

FOREIGN PATENT DOCUMENTS

DE 10239437 A1 3/2004
DE 102005037826 B4 * 8/2007 ........... B60N 2/2812
(Continued)

*Primary Examiner* — Karen Beck
(74) *Attorney, Agent, or Firm* — Foley & Lardner LLP

(57) ABSTRACT

The invention relates to a vehicle seat for a motor vehicle, comprising a backrest (10), a seat (11) and an airbag device, wherein the airbag device comprises at least one airbag module (12) and at least one arrestor strap mechanism, wherein the at least one airbag module (12) comprises at least one airbag (14) and the at least one arrestor strap mechanism comprises at least one arrestor strap arrangement (2) and at least one tensioning device (3) for the arrestor strap arrangement (2), wherein one end of the arrestor strap 10 arrangement (2) is attached to the airbag (14), wherein the tensioning device (3) is arranged on the seat (11).

18 Claims, 4 Drawing Sheets

Figure 1:
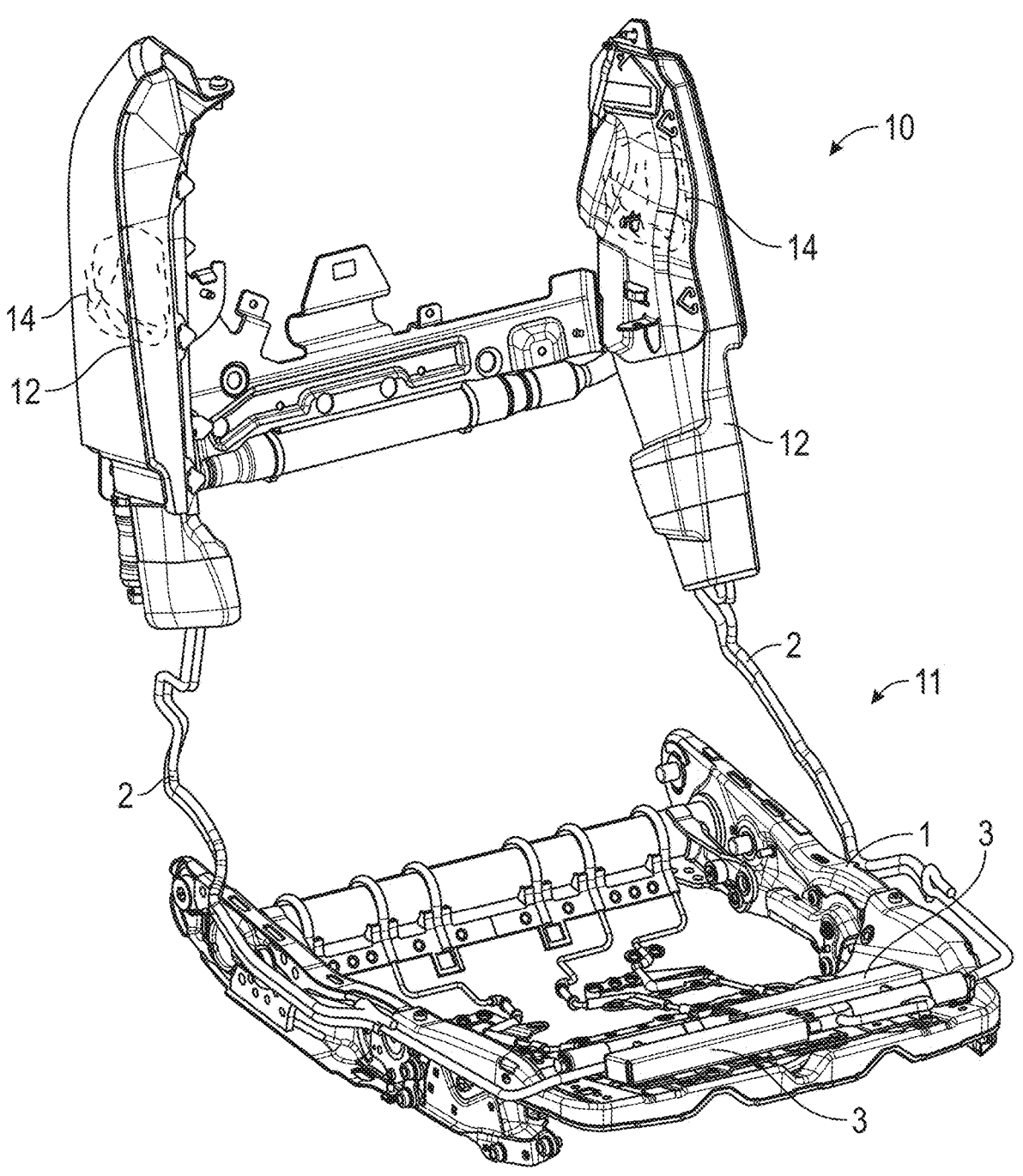

(51) Int. Cl.
    *B60R 21/16*      (2006.01)
    *B60R 21/2338*   (2011.01)
    *B60N 2/58*      (2006.01)

(52) U.S. Cl.
    CPC . *B60N 2002/5808* (2013.01); *B60R 2021/161*
              (2013.01); *B60R 2021/23386* (2013.01)

(56)                    References Cited

U.S. PATENT DOCUMENTS

| 2013/0190990 | A1 | | 7/2013 | Haidar | |
|---|---|---|---|---|---|
| 2019/0248322 | A1 | | 8/2019 | Herzenstiel et al. | |
| 2021/0402948 | A1 | * | 12/2021 | Kang | B60R 21/207 |
| 2022/0274555 | A1 | | 9/2022 | Matsushita | |

FOREIGN PATENT DOCUMENTS

| DE | 102008022168 | B3 | * | 10/2009 | B60R 22/1952 |
|---|---|---|---|---|---|
| DE | 102015204099 | A1 | * | 9/2016 | B60R 21/18 |
| DE | 102020101051 | A1 | | 7/2021 | |
| DE | 102020125263 | A1 | | 7/2021 | |
| DE | 102022106750 | A1 | * | 9/2023 | B60R 21/2338 |
| DE | 102022106751 | A1 | * | 9/2023 | B60R 21/207 |
| DE | 102022124259 | A1 | * | 3/2024 | B60R 21/2338 |
| EP | 3862231 | A1 | | 8/2021 | |
| WO | 2019107398 | A1 | | 6/2019 | |
| WO | 2021/111723 | A1 | | 6/2021 | |
| WO | 2021111748 | A1 | | 6/2021 | |

\* cited by examiner

3

4

7    5    8    2

VEHICLE SEAT

The invention relates to a vehicle seat for a motor vehicle, comprising a backrest, a seat and an airbag device, wherein the airbag device comprises at least one airbag module and at least one arrestor strap mechanism, wherein the at least one airbag module comprises at least one airbag and the arrestor strap mechanism comprises at least one arrestor strap arrangement and at least one tensioning device for the arrestor strap arrangement, wherein one end of the arrestor strap arrangement is attached to the airbag.

Such a vehicle seat with an arrestor strap mechanism is known, for example, from US 2019/0248322 A1. The airbag, which is arranged in the initial state in a side region of a backrest, unfolds next to and/or in front of an occupant on the vehicle seat after it is triggered. It can be provided that the arrestor strap arrangement guides the deployment process at least temporarily during the deployment of the airbag, for example when the arrestor strap arrangement is in a tensioned state. It is also conceivable that the arrestor strap arrangement is unwound from a spool during deployment or is tensioned from a wound or folded state by the deploying airbag.

The tensioning device arranged in the backrest in accordance with US 2019/0248322 A1 is provided to retract the arrestor strap arrangement during deployment or at the end of the deployment process and thus to influence the deployment process or to bring the airbag into a final position after deployment. For example, a portion of the airbag attached in front of the occupant after deployment can be pulled towards the backrest by the tensioning device so that the occupant is also pulled towards the backrest. From US 2019/0248322 A1, for example, it is known to wind up the arrestor strap arrangement by means of the tensioning device through a rotary movement.

The object of the present invention is to provide an alternative way of tensioning the arrestor strap arrangement.

A solution to achieve the object is specified in independent claim 1, wherein further solutions and advantageous developments are specified in the dependent claims and in the preceding and following description, wherein individual features of the advantageous developments can be combined with one another in a technically reasonable manner.

The object is achieved in particular by a vehicle seat with the features mentioned above, in which the tensioning device is arranged on the seat.

In other words, the basic idea of the invention is that the tensioning device is not arranged in the backrest and thus adjacent to the airbag module, but instead that the tensioning device for the arrestor strap arrangement is arranged on the seat of the vehicle seat. The center of gravity of the seat is therefore arranged lower. The arrestor strap arrangement, which can be tensioned by the tensioning device, can be guided to other portions of the vehicle seat via appropriate guides.

The seat of a vehicle seat usually comprises a solid base structure (e.g., a type of frame) called the seat well and upholstery that covers the seat well at least on its upper side.

It can now be provided that the tensioning device is attached to a seat well of the seat. The tensioning device is thus fixed directly above the seat well in a state installed in a vehicle. In principle, the tensioning device can be arranged on the underside of the seat well and attached thereto. Alternatively, the tensioning device can be attached to one side of the seat well. However, it is preferred that the tensioning device is arranged above a seat well of the seat and in particular is directly connected to the seat well.

It can be provided that the tensioning device is arranged in an upholstery of the seat. The tensioning device is thus at least partially surrounded by the upholstery of the seat, for which purpose the upholstery can have recesses to accommodate the tensioning device.

The tensioning device preferably comprises a tensioning element that can be accelerated in a straight line and can be accelerated in particular by means of a pyrotechnic drive.

The tensioning device can, for example, comprise a tensioner tube in which a piston is arranged. For example, an inflator can be used to introduce compressed gas into the tensioner tube, which drives the piston through the tensioner tube. The piston, which is arranged in particular in the tensioner tube, is connected to the tensioning element, for example via a piston rod, so that the tensioning element is directly driven by an acceleration of the piston.

The tensioning device is coupled in particular via the tensioning element to the arrestor strap arrangement in such a way that the arrestor strap arrangement is deflected by the tensioning element at least before and/or during the tensioning process. The portions arranged in front of and behind the tensioning element in the direction of the arrestor strap are therefore arranged at an angle to one another. For example, the arrestor strap arrangement can be deflected by the tensioning element more than 60°, preferably more than 90° or approximately 180°. The degree of deflection can be constant during the tensioning process, but can also change during the tensioning process. In a preferred embodiment, a deflection of 180°, which does not change during the tensioning process, is carried out by means of the tensioning element.

In particular in this context it can be provided that the arrestor strap arrangement is fixed on one side of the tensioning device and is guided on the opposite side of the tensioning device for a tensioning movement in a guide having, for example, an opening, wherein the arrestor strap arrangement preferably runs laterally offset to the tensioning device parallel to the straight-line movement direction of the tensioning element. The arrestor strap arrangement runs parallel to the straight-line movement direction of the tensioning element, in particular before and preferably also during the tensioning process.

The arrestor strap arrangement and the tensioning element that can be accelerated in a straight line are arranged in particular in such a way that a type of pulley is formed, in which the tensioning element forms the moving deflection. The tensioning element which can be accelerated in a straight line and the arrestor strap arrangement are arranged in particular in such a way that the end of the arrestor strap arrangement which is attached to the airbag covers a greater distance during the tensioning process than the tensioning element which is accelerated in a straight line. For this purpose, the arrestor strap mechanism can comprise one or more deflectors for the arrestor strap arrangement.

In particular, the tensioning device is arranged in such a way that the tensioning element can be accelerated in the lateral direction of the seat. In a state typically installed in a vehicle, the straight-line acceleration direction of the tensioning element runs transversely, preferably orthogonally, to the vehicle longitudinal direction.

Each arrestor strap arrangement can be made from a single arrestor strap or arrestor rope, which is made in particular from a tensile fabric. The arrestor strap arrangement can also be made of a plurality of arrestor straps/arrestor ropes connected to one another.

In a preferred embodiment, it can be provided that the piston rod of the tensioning device is formed in a plurality of parts, in particular from two parts. The plurality of parts is arranged telescopically relative one to another. Compared to a one-piece piston rod, a multi-piece and telescopic piston rod has the advantage that a tensioning element coupled to the piston rod can cover a greater path with the same length of the tensioner tube. In the initial state, the telescopically arranged parts of the piston rod are pushed into one another and are moved towards one another in their axial direction by the application of pressure, so that a path almost twice as long is possible for the tensioning element. All parts of the piston rod are therefore driven by the compressed gas.

It can be provided that the tensioning element is attached directly to the piston rod of the tensioning device. In one embodiment, however, it is proposed that a type of cage is attached to the piston rod, wherein the tensioning element, designed for example as a deflection roller, is arranged in the cage. In addition, a guide for the arrestor strap arrangement can be provided in the cage so that the arrestor strap arrangement is guided along a predetermined path towards and away from the tensioning element.

In a preferred embodiment, it is provided that the vehicle seat comprises two airbag modules, which are arranged in particular on opposite sides of the backrest, wherein at least one arrestor strap arrangement is attached to each airbag of the airbag module.

In principle, it is possible for a plurality of arrestor strap arrangements to be tensioned with just one tensioning device. However, it is preferred that each airbag module is assigned a tensioning device which is arranged on the seat.

The invention also relates to an arrestor strap mechanism with an arrestor strap arrangement and a tensioning device for a vehicle seat, wherein the above features described with reference to the vehicle seat can be applied to the arrestor strap mechanism.

The invention and the technical environment are explained below by way of example with reference to the figures. The figures show schematically FIG. 1: a seat well of a vehicle seat with two tensioning devices, FIG. 2: a perspective view of a tensioning device, FIG. 3: an exploded view of the tensioning device, and FIG. 4: a sectional view of the tensioning device.

Figure 5:
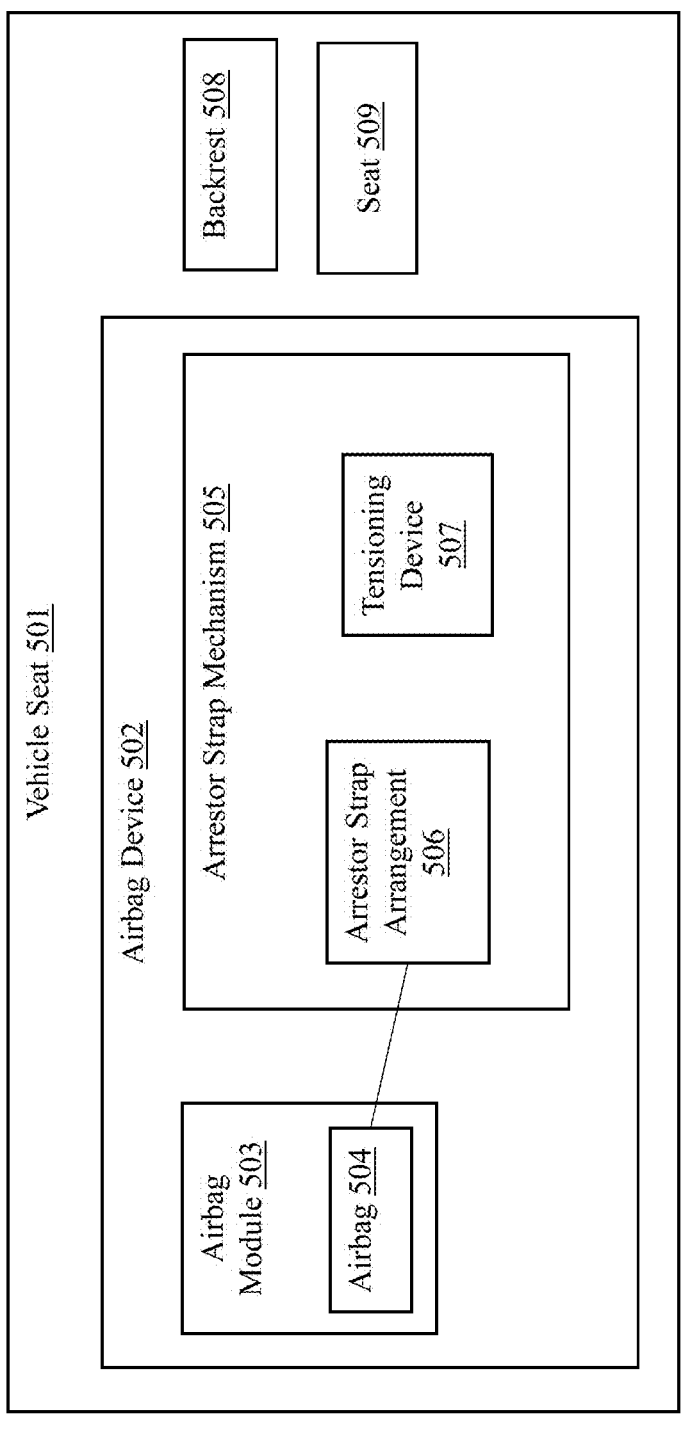

FIG. 5: a block diagram of a vehicle seat.

Figure 2:
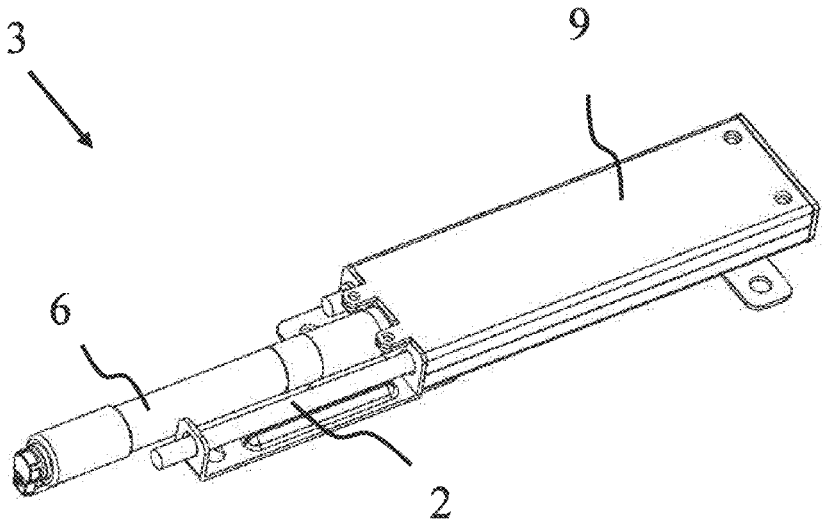
Figure 3:
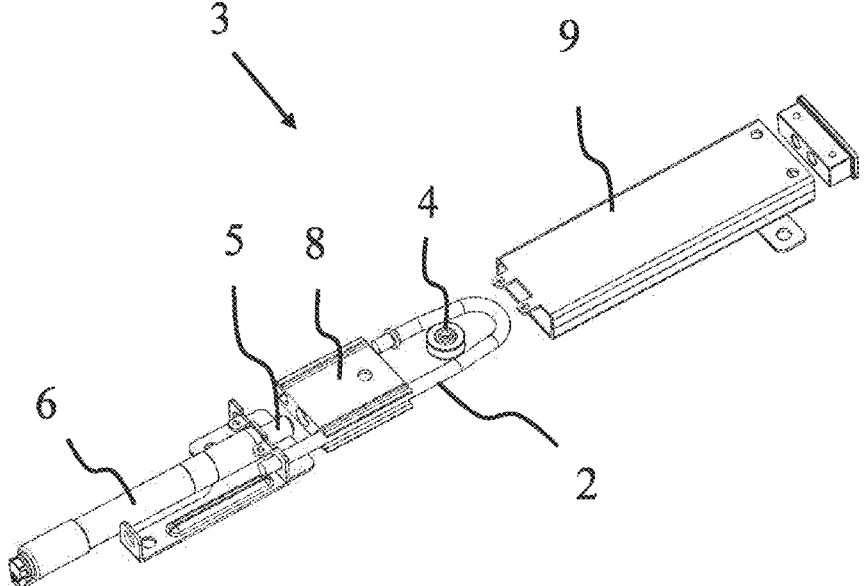
Figure 4:
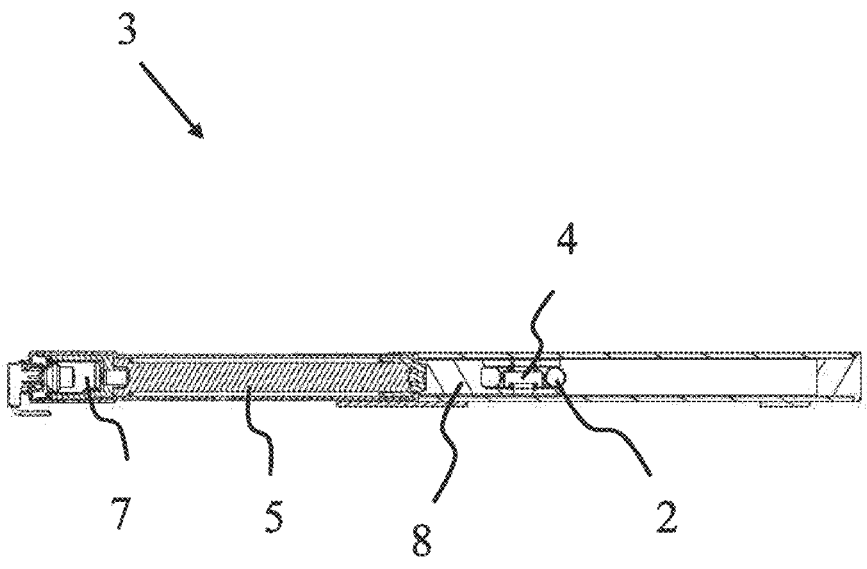

The tensioning device shown in FIGS. 2 to 4 comprises a tensioner tube 6 in which a piston rod 5 is arranged. The piston rod 5 can be accelerated in a straight line by means of a compressed gas generated by an inflator 7. At the end of the piston rod 5 which in the initial state protrudes beyond the tensioner tube 6, a cage 8 is attached in which a tensioning element 4 designed as a deflection roller is mounted.

The tensioning device 3 is also coupled to an arrestor strap arrangement 2, which is fixed on one side of the tensioner tube 6, is guided from there through the cage 8 and is deflected by the tensioning element 4. The arrestor strap arrangement 2 is guided on the other side through the cage 8 and laterally past the tensioner tube 6. The cage 8 is arranged in a housing 9 so that the cage 8 is protected by the housing 9 during the tensioning movement.

FIG. 1 shows a basic frame of a vehicle seat with a backrest 10 and a seat 11. From FIG. 1 it can be seen that two tensioning devices 3 are directly attached to a seat well 1 of the seat 11 of the vehicle seat. The tensioning devices 3 are aligned such that the tensioning elements 4 are accelerated orthogonally to a vehicle longitudinal direction in the installed state in a vehicle. The arrestor strap arrangements 2 are each guided by means of a suitable guide to an airbag

14 of an airbag module 12, which are attached to opposite sides of the backrest 10 of the vehicle seat.

In the event of activation, the tensioning element 4 is accelerated in a straight line by means of the piston rod 5, whereby the free end of the arrestor strap arrangement 2 attached to the airbag 14 is retracted. The tensioning device 3 forms a type of pulley for the arrestor strap arrangement 2, so that the tensioning path covered by the free end of the arrestor strap 5 arrangement 2 corresponds approximately to twice the path covered by the tensioning element 4. The airbags 14 can be guided during deployment by means of the arrestor strap arrangement 2 or can be brought into a desired position after deployment by means of the arrestor strap arrangements.

FIG. 5 is a block diagram of a vehicle seat 501. The vehicle seat 501 includes an airbag device 502, a backrest, and a seat 509. The airbag device 502 includes an airbag module 503 and an arrestor strap mechanism 505. The airbag module 503 includes an airbag 504. The arrestor strap mechanism 505 includes an arrestor strap arrangement 506 and a tensioning device 507, where one end of the arrestor strap arrangement 506 is attached to the airbag 504.

LIST OF REFERENCE SIGNS

1 Seat well
2 Arrestor strap arrangement
3 Tensioning device
4 Tensioning element
5 Piston rod
6 Tensioner tube
7 Inflator
8 Cage
9 Housing
10 Backrest
11 Seat
12 Airbag module
14 Airbag

The invention claimed is:

1. Vehicle seat for a motor vehicle, comprising:
a backrest,
a seat, and
an airbag device, wherein the airbag device comprises at least one airbag module and at least one arrestor strap mechanism, wherein
the at least one airbag module comprises at least one airbag, and
the at least one arrestor strap mechanism comprises at least one arrestor strap arrangement and at least one tensioning device for the arrestor strap arrangement, wherein one end of the arrestor strap arrangement is attached to the airbag,
wherein
the tensioning device is arranged at the seat,
wherein the arrestor strap mechanism and the tensioning device are arranged to form a pulley in which the tensioning device accelerates a tensioning element of the tensioning device in a straight line to deflect the arrestor strap mechanism.

2. The vehicle seat according to claim 1, wherein the tensioning device is attached to a seat well of the seat.

3. The vehicle seat according to claim 1, wherein the tensioning device is arranged above a seat well of the seat.

4. The vehicle seat according to claim 1, wherein the tensioning device is arranged in an upholstery of the seat.

5. The vehicle seat according to claim 1, wherein the tensioning device is arranged to accelerate the tensioning element in a lateral direction of the seat.

6. The vehicle seat according to claim 1, wherein the tensioning device is configured to accelerate the tensioning element pyrotechnically.

7. The vehicle seat according to claim 1, wherein the tensioning device has a drivable piston rod that is multi-part, wherein the parts of the piston rod are arranged telescopically with respect to one another.

8. The vehicle seat according to claim 1, wherein the arrestor strap arrangement is fixed on one side of the tensioning device and is guided on the opposite side of the tensioning device for a tensioning movement.

9. The vehicle seat according to claim 1, wherein the arrestor strap arrangement travels laterally with respect to the tensioning device, parallel to the straight-line movement direction of the tensioning element.

10. The vehicle seat according to claim 1, wherein the airbag device comprises two airbag modules and the two airbag modules are arranged on opposite sides of the backrest, wherein an arrestor strap arrangement is associated with each airbag module.

11. The vehicle seat according to claim 10, wherein a tensioning device is associated with each airbag module, which tensioning device is respectively arranged at the seat.

12. The vehicle seat according to claim 1, wherein the tensioning element is rotatably mounted in the tensioning device.

13. The vehicle seat according to claim 12, wherein the tensioning element comprises a deflection roller.

14. The vehicle seat according to claim 13, wherein the tensioning element is mounted in a cage of the tensioning device, and wherein the arrestor strap arrangement is guided through the cage.

15. The vehicle seat according to claim 14, wherein the cage is arranged in a housing to guide an acceleration movement of the cage.

16. The vehicle seat according to claim 1, wherein another end of the arrestor strap arrangement is fixed.

17. The vehicle seat according to claim 1, wherein the arrestor strap mechanism and the tensioning device are arranged such that a tensioning path covered by the end of the arrestor strap arrangement attached to the airbag corresponds approximately to twice a path covered by the tensioning element.

18. The vehicle seat according to claim 11, wherein the two tensioning devices are arranged to accelerate their respective tensioning elements in opposite lateral directions.

* * * * *